US010318044B2

(12) United States Patent
Takeda (10) Patent No.: US 10,318,044 B2
(45) Date of Patent: Jun. 11, 2019

(54) ELECTRONIC DEVICE HAVING TOUCH SENSORS ON BOTH FRONT AND BACK SURFACES (71) Applicant: KYOCERA Corporation, Kyoto (JP)

(72) Inventor: Jun Takeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/106,760

(22) PCT Filed: Dec. 18, 2014

(86) PCT No.: PCT/JP2014/006332
§ 371 (c)(1),
(2) Date: Jun. 20, 2016

(87) PCT Pub. No.: WO2015/098061
PCT Pub. Date: Jul. 2, 2015

(65) Prior Publication Data
US 2017/0038893 A1  Feb. 9, 2017

(30) Foreign Application Priority Data

Dec. 24, 2013 (JP) ................. 2013-266053
Dec. 24, 2013 (JP) ................. 2013-266055

(51) Int. Cl.
G06F 3/041 (2006.01)
G06F 3/0485 (2013.01)
(Continued)

(52) U.S. Cl.
CPC ............ *G06F 3/0416* (2013.01); *G06F 3/044* (2013.01); *G06F 3/045* (2013.01); *G06F 3/0485* (2013.01);
(Continued)

(58) Field of Classification Search
CPC ........ G06F 3/0416; G06F 3/044; G06F 3/045; G06F 3/0485; G06F 3/0488;
(Continued)

(56) References Cited

U.S. PATENT DOCUMENTS 6,954,899 B1 * 10/2005 Anderson ............... G06F 3/016
345/157
8,712,478 B2   4/2014 Inami
(Continued)

FOREIGN PATENT DOCUMENTS

JP  2010154090 A  7/2010
JP  2011-36424 A   2/2011
(Continued)

OTHER PUBLICATIONS

Office Action issued by the Japanese Patent Office dated Feb. 21, 2017, which corresponds to Japanese Patent Application No. 2013-266055 and is related to U.S. Appl. No. 15/106,760; with Concise Explanation of Relevance; 5pp.
(Continued)

*Primary Examiner* — Amr A Awad
*Assistant Examiner* — Maheen I Javed
(74) *Attorney, Agent, or Firm* — Studebaker & Brackett PC (57) ABSTRACT An electronic device that can be operated with one hand more easily is provided. An electronic device 1 includes a touch sensor on each of the front surface and the back surface. A controller 14 changes the position of an object displayed in an upper part of a display 11 to a lower part of the display 11, upon detecting an operation on a back surface touch sensor 13. The controller 14 causes the display 11 to display an object not being displayed, upon detecting an operation on the back surface touch sensor 13.

10 Claims, 11 Drawing Sheets (51) Int. Cl.
*G06F 3/0488* (2013.01)
*G06F 3/044* (2006.01)
*G06F 3/045* (2006.01)

(52) U.S. Cl.
CPC .. *G06F 3/0488* (2013.01); *G06F 2203/04105* (2013.01); *G06F 2203/04803* (2013.01)

(58) Field of Classification Search
CPC . G06F 2203/04105; G06F 2203/04803; G06F 3/04886
See application file for complete search history.

(56) References Cited

U.S. PATENT DOCUMENTS

| | | | | |
|---|---|---|---|---|
| 2008/0165153 A1* | 7/2008 | Platzer | ............... | G06F 1/1626 345/173 |
| 2012/0276958 A1 | 11/2012 | Inami | | |
| 2013/0265284 A1* | 10/2013 | Yun | ............... | G06F 3/0416 345/175 |
| 2014/0176454 A1* | 6/2014 | Yu | ............... | G06F 3/0412 345/173 |
| 2014/0243092 A1* | 8/2014 | Morita | ............... | G06F 3/04845 463/31 |
| 2015/0293671 A1* | 10/2015 | Miki | ............... | G06F 1/1626 345/173 |

FOREIGN PATENT DOCUMENTS

| | | |
|---|---|---|
| JP | 2012-230567 A | 11/2012 |
| JP | 2013-097563 A | 5/2013 |
| JP | 2013-142907 A | 7/2013 |
| JP | 2015-028688 A | 2/2015 |

OTHER PUBLICATIONS

An Office Action issued by the Japanese Patent Office dated Mar. 13, 2018, which corresponds to Japanese Patent Application No. 2013-266053 and is related to U.S. Appl. No. 15/106,760; with English language concise explanation.
International Search Report issued in PCT/JP2014/006332; dated Feb. 24, 2015.
Written Opinion issued in PCT/JP2014/006332; dated Feb. 24, 2015; with English language Concise Explanation.

* cited by examiner

ELECTRONIC DEVICE HAVING TOUCH SENSORS ON BOTH FRONT AND BACK SURFACES

CROSS REFERENCE TO RELATED APPLICATION

This application claims priority to Japanese Patent Applications Nos. 2013-266053 and 2013-266055 filed on Dec. 24, 2013, the entire disclosures of which are incorporated herein by reference.

TECHNICAL FIELD

The disclosure relates to an electronic device having a touch sensor on the back surface.

BACKGROUND

Electronic devices, such as mobile phones, having touch sensors for detecting contact by users have been on the increase in recent years. Various contact detection methods such as resistive method and capacitive method are known, each of which detects the contact of a contact object such as a user's finger or a stylus.

Electronic devices having touch sensors not only on the front surface but also on the back surface are known, too. For example, Patent Literature (PTL) 1 describes a mobile terminal that includes two touch sensors on each of the front surface and the back surface, and provides improved convenience by receiving, based on a predetermined correspondence relationship associated with a use state, an input to a first back surface or a second back surface as an input to a first front surface or a second front surface.

CITATION LIST

Patent Literature

PTL 1: JP 2012-230567 A

SUMMARY

Technical Problem

In the case where a user operates an electronic device with one hand, the user needs to operate objects such as ions and tabs displayed on the front surface of the electronic device with the thumb while holding the sides and back surface of the electronic device with the other four fingers and the palm. If the size of the electronic device is larger, an object displayed in the upper part of the front surface is out of the reach of the thumb, and the user has difficulty in operating the electronic device with one hand.

It could therefore be helpful to provide an electronic device that can be operated with one hand more easily.

Solution to Problem

An electronic device according to the disclosure includes: a touch sensor on each of a front surface and back surface thereof; and a controller configured to, upon detecting an operation on the touch sensor on the back surface, change a position of an object displayed in an upper part of a display to a lower part of the display.

In the electronic device according to the disclosure, the object is not moved by an operation on the touch sensor on the front surface.

In the electronic device according to the disclosure, the controller is configured to replace upper and lower objects with each other, when changing the position of the object.

The electronic device according to the disclosure includes a pressure detector configured to detect pressure on the touch sensor on the back surface, wherein the controller is configured to change the position of the object in the case where data based on the pressure detected by the pressure detector satisfies a predetermined criterion.

An electronic device according to the disclosure includes: a touch sensor on each of a front surface and back surface thereof; and a controller configured to, upon detecting an operation on the touch sensor on the back surface, slide a screen displayed in an upper part of a display downward.

The electronic device according to the disclosure includes a pressure detector configured to detect pressure on the touch sensor on the back surface, wherein the controller is configured to slide the screen downward in the case where data based on the pressure detected by the pressure detector satisfies a predetermined criterion.

An electronic device according to the disclosure includes: a touch sensor on each of a front surface and back surface thereof; and a controller configured to, upon detecting an operation on the touch sensor on the back surface, cause a display to display an object not being displayed.

In the electronic device according to the disclosure, the controller is configured to, upon detecting sliding on the touch sensor on the back surface, cause the display to display the object while sliding the object in a same direction as the detected sliding.

The electronic device according to the disclosure includes a pressure detector configured to detect pressure on the touch sensor on the back surface, wherein the controller is configured to cause the display to display the object in the case where data based on the pressure detected by the pressure detector satisfies a predetermined criterion.

In the electronic device according to the disclosure, the controller is configured to, upon detecting sliding on the touch sensor on the back surface after the data based on the pressure detected by the pressure detector satisfies the predetermined criterion, cause the display to display the object while sliding the object in a same direction as the detected sliding.

In the electronic device according to the disclosure, the controller is configured to, upon detecting sliding on the touch sensor on the back surface during a time when the data based on the pressure detected by the pressure detector satisfies the predetermined criterion, cause the display to display the object while sliding the object in a same direction as the detected sliding.

Advantageous Effect

It is possible to provide an electronic device that can be operated with one hand more easily.

DETAILED DESCRIPTION

The following describes the disclosed embodiments in detail with reference to drawings.

Embodiment 1

Figure 1:
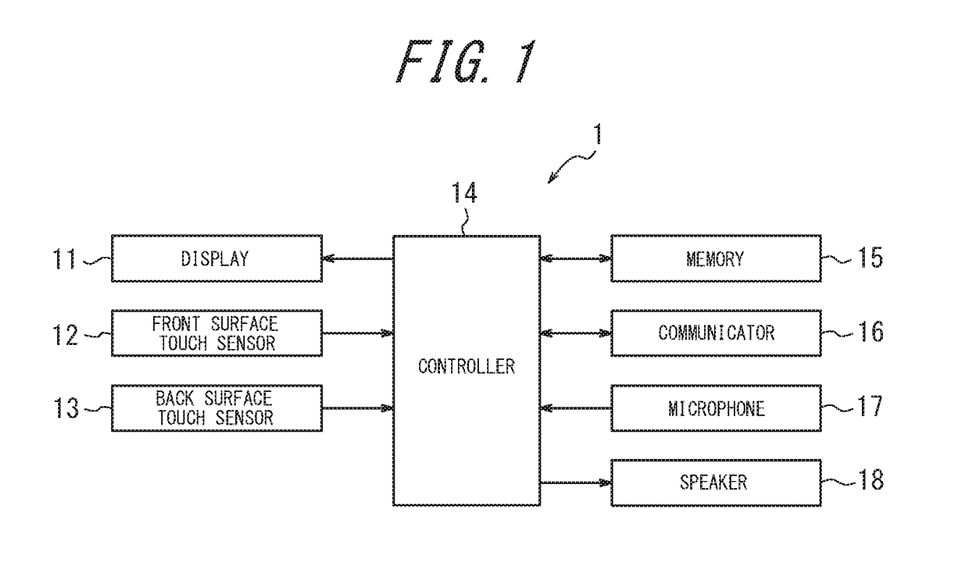
FIG. 1 is a block diagram illustrating the schematic structure of an electronic device according to Embodiment 1.

FIG. 1 is a block diagram illustrating the schematic structure of an electronic device according to Embodiment 1. In the example illustrated in FIG. 1, an electronic device 1 includes a display 11, a front surface touch sensor 12, a back surface touch sensor 13, a controller 14, a memory 15, a communicator 16, a microphone 17, and a speaker 18.

The display 11 displays images of text, photographs, objects, etc. The objects include icons, tabs, and input windows enabling text input. The display 11 includes a liquid crystal display (LCD) panel, an organic electroluminescent display (OELD) panel, or the like. For example, the display 11 displays icons for performing functions such as phone, mail, Internet communication, and camera, on a home screen.

The front surface touch sensor 12 detects the contact or release of contact of at least one finger on the input plane of the front surface touch sensor 12. The front surface touch sensor 12 detects the position of contact on the input plane, and outputs a signal indicating the detected contact position to the controller 14. The front surface touch sensor 12 is composed of a transparent member, and overlaid on the front surface of the display 11. The user views images on the display 11 through the transparent front surface touch sensor 12, and operates the front surface touch sensor 12 at the display position of an object displayed by the display 11 to cause the electronic device 1 to execute a predetermined process. Here, an operation on a touch sensor is any kind of operation of bringing a finger into contact with the touch sensor, such as touching, tapping, double-tapping, sliding, flicking, and swiping.

The back surface touch sensor 13 is placed on the back surface of the electronic device 1 to improve the ease of operating the electronic device 1 with one hand. The back surface touch sensor 13 detects the contact or release of contact of at least one finger on the input plane of the back surface touch sensor 13, and outputs the detection result to the controller 14. The front surface touch sensor 12 and the back surface touch sensor 13 are realized by, for example, a well-known method such as resistive method or capacitive method.

The controller 14, upon detecting an operation on the front surface touch sensor 12 from a signal received from the front surface touch sensor 12, executes a process corresponding to an object displayed at the contact position.

Moreover, upon detecting a predetermined operation on the back surface touch sensor 13 from a signal received from the back surface touch sensor 13, the controller 14 changes the position of an object or upper screen being displayed by the display 11. Specific examples of such a process will be described later.

Further, upon detecting a predetermined operation on the back surface touch sensor 13 from a signal received from the back surface touch sensor 13, the controller 14 causes the display 11 to display an object (hidden object) not being displayed by the display 11. Specific examples of such a process will be described later.

The memory 15 may be semiconductor memory or the like. The memory 15 stores various information and programs for operating the electronic device 1, and also functions as working memory.

The communicator 16 wirelessly communicates with a base station or another communication device, to enable Internet connection, telephone line connection, e-mail transmission and reception, etc.

The microphone 17 collects ambient sound such as the user's voice. The microphone 17 converts the collected sound into an electrical signal, and sends the electrical signal to the controller 14.

The speaker 18 outputs sound such as voice, music, and ringtone.

Figure 2A:
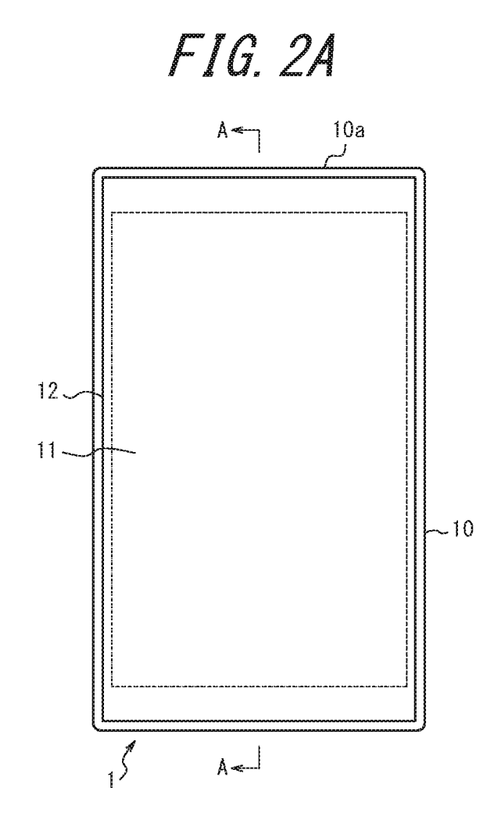
FIGS. 2A to 2C are diagrams illustrating an example of the implementation structure of the electronic device according to Embodiment 1.
Figure 2B:
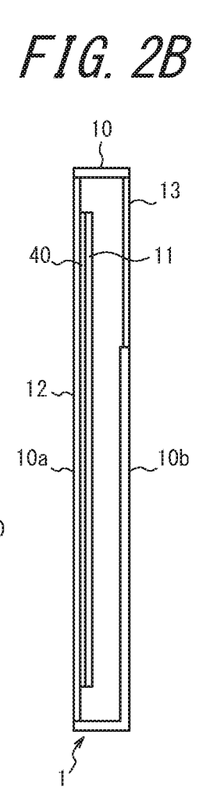
Figure 2C:
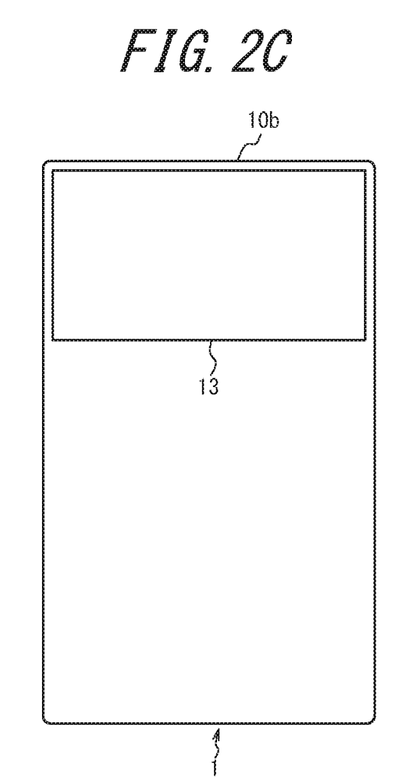

FIG. 2 is a diagram illustrating an example of the implementation structure of the electronic device 1 according to Embodiment 1. FIG. 2A is a front view, FIG. 2B is a sectional view along line A-A in FIG. 2A, and FIG. 2C is a back view.

Elements other than a housing 10, the display 11, the front surface touch sensor 12, the back surface touch sensor 13, and a joining member 40 are not illustrated in FIG. 2. The electronic device 1 may include elements other than those illustrated in FIG. 2, such as the controller 14, a substrate, and various components. Typically, the microphone 17 is located in the lower part of the front surface touch sensor 12, and the speaker 18 is located in the upper part of the front surface touch sensor 12.

The front surface touch sensor 12 is placed on the front surface 10a of the housing 10 (e.g. a metal or resin case) and supported by the housing 10, as illustrated in FIG. 2.

The display 11 is placed inside the housing 10. For example, the display 11 may be bonded to the back surface of the front surface touch sensor 12, or fixed directly to the inside of the housing 10 or fixed to a substrate, display holder, or the like placed inside the housing 10. In FIG. 2, the display 11 is bonded to the front surface touch sensor 12 via the joining member 40. In the case where the display 11 is placed on the back surface side of the front surface touch sensor 12 as illustrated in FIG. 2B, a user interface can be freely displayed on the display 11 to detect the user's operation by the front surface touch sensor 12 when the front surface touch sensor 12 and the display 11 constitute a touch panel. The joining member 40 may be an adhesive or double-faced tape which is thermosetting, ultraviolet curable, or the like, e.g. an optical elastomeric resin which is a colorless and transparent acrylic ultraviolet curable adhesive.

The back surface touch sensor 13 is placed on the back surface 10b of the housing 10 and supported by the housing 10 so that the back surface touch sensor 13 includes an area that can be touched by the index finger when the user holds the electronic device 1 with one hand. For example, the back surface touch sensor 13 is located in the upper part of the back surface 10b of the housing 10, as illustrated in FIGS. 2B and 2C.

Figure 3A:
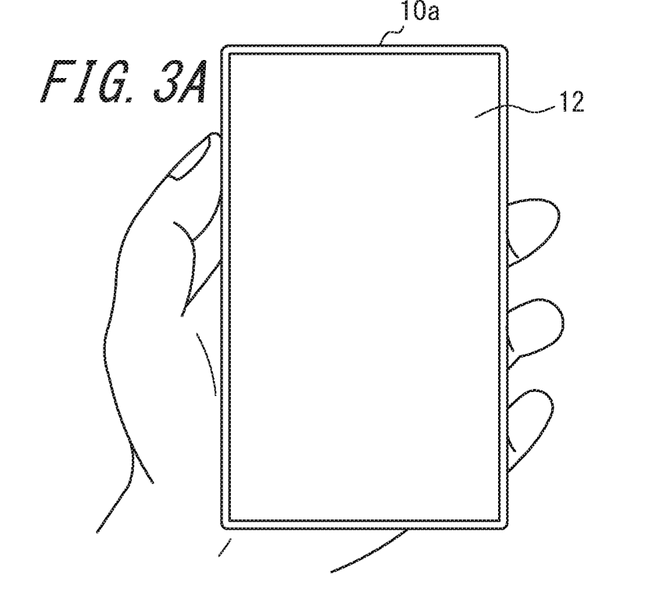
FIGS. 3A to 3B are diagrams illustrating a state where a user holds the electronic device with the left hand.
Figure 3B:
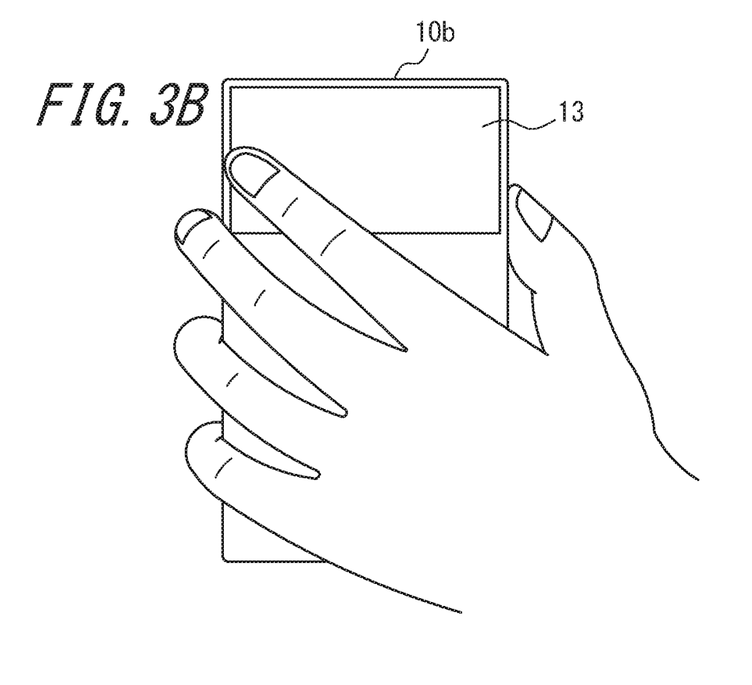

FIG. 3 is a diagram illustrating a state where the user holds the electronic device 1 with the left hand. FIG. 3A is a front view, and FIG. 3B is a back view. When the user holds the electronic device 1 with the left hand, the index finger is on the back surface touch sensor 13, as illustrated in FIG. 3B. Therefore, the user can easily operate the back surface touch sensor 13 simply by flexing the index finger, without moving the other fingers. Although the location of the back surface touch sensor 13 is limited to the area that can be touched by the index finger in this embodiment, the back surface touch sensor 13 may be located in a wider area.

Figure 4:
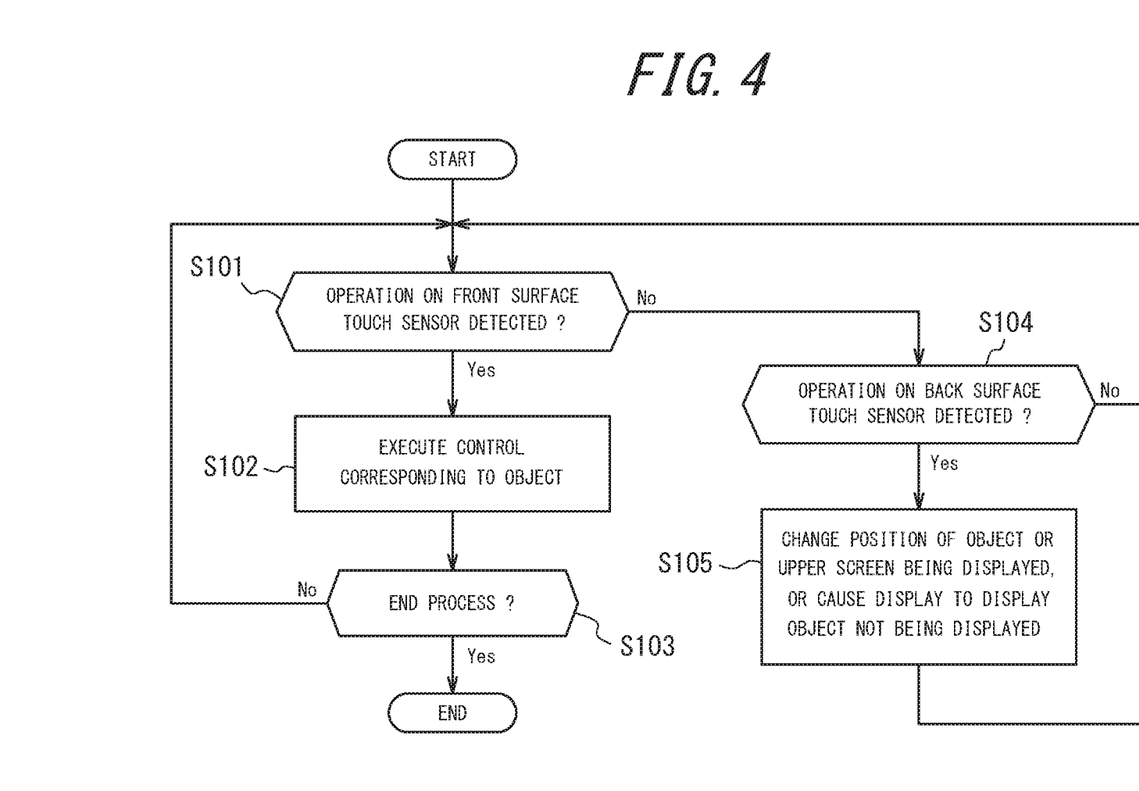
FIG. 4 is a flowchart illustrating the process by the electronic device according to Embodiment 1.

The process by the electronic device 1 according to one of the disclosed embodiments is described below, with reference to FIG. 4. FIG. 4 is a flowchart illustrating the process by the electronic device 1 according to Embodiment 1.

Upon detecting a predetermined operation on the front surface touch sensor 12 from a signal received from the front surface touch sensor 12 (step S101: Yes), the controller 14 executes a process corresponding to an object displayed at the contact position (step S102). For example, when a browser icon for starting Internet connection is displayed by the display 11 and tapping at the display position of the browser icon is detected by the front surface touch sensor 12, the controller 14 causes the communicator 16 to start Internet connection and access a predetermined URL, and causes the display 11 to display the acquired site screen. In the case where the process in step S102 is a process of ending the browser of the electronic device 1 (step S103: Yes), the controller 14 ends the process and, for example, causes the display 11 to display a home screen (standby screen).

Upon detecting a predetermined operation (e.g. sliding) on the back surface touch sensor 13 from a signal received from the back surface touch sensor 13 (step S104: Yes), the controller 14 changes the position of an object or upper screen being displayed, or causes the display 11 to display an object not being displayed (step S105). Specific examples of the process in step S105 are described below.

Figure 5A:
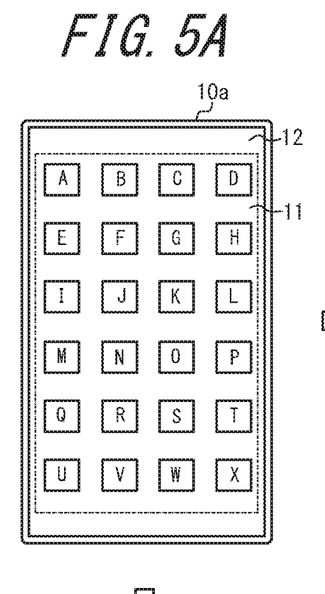
FIGS. 5A to 5C are diagrams illustrating a first mode of the process performed by operating the back surface touch sensor of the electronic device according to Embodiment 1.

FIG. 5 is a diagram illustrating a first mode of the process performed by operating the back surface touch sensor 13. FIG. 5A illustrates a screen, such as a home screen or a folder screen, on which a plurality of objects (icons) are displayed. Although square objects A to X are illustrated as an example of display, the shape and number of objects are not limited to such. When operating the electronic device 1 with one hand, the user has difficulty in selecting an object displayed in the upper part of the screen in FIG. 5A with the thumb. Hence, the controller 14 in the electronic device 1 according to one of the disclosed embodiments changes the position of one or more objects displayed in the upper part of the display 11 to the lower part of the display 11, upon detecting a predetermined operation (e.g. sliding) on the back surface touch sensor 13.

Figure 5B:
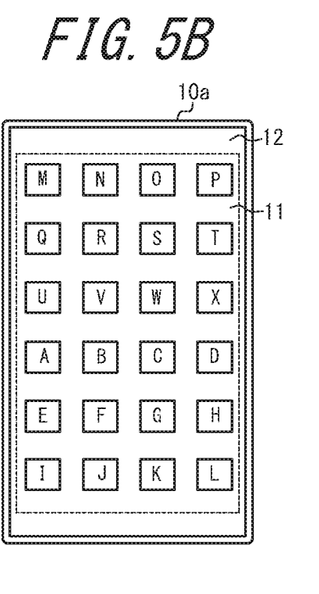
Figure 5C:
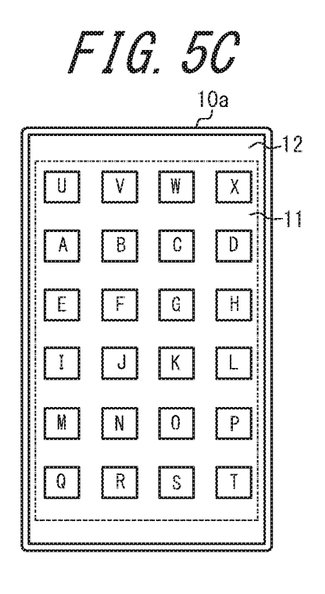

Changing the position of one or more objects may be performed in various manners. As an example, the controller 14 may replace the objects A to L in the upper half of the object group and the objects M to X in the lower half of the object group with each other when the predetermined operation on the back surface touch sensor 13 is detected, as illustrated in FIG. 5B. Alternatively, the controller 14 may shift the objects down by one or more rows each time the predetermined operation on the back surface touch sensor 13 is detected, thus replacing the upper and lower objects with each other. FIG. 5C illustrates a state where the objects are shifted down by one row from the arrangement in FIG. 5A so that the objects U to X displayed at the bottom are now displayed at the top.

Figure 6A:
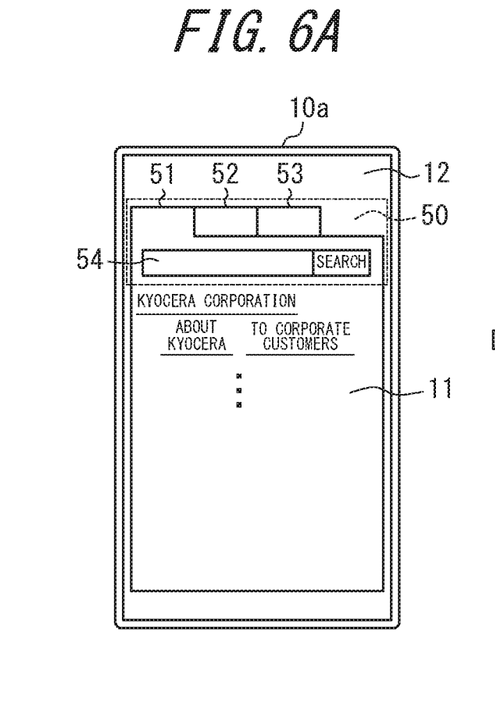
FIGS. 6A to 6B are diagrams illustrating a second mode of the process performed by operating the back surface touch sensor of the electronic device according to Embodiment 1.

FIG. 6 is a diagram illustrating a second mode of the process performed by operating the back surface touch sensor 13. In the example illustrated in FIG. 6A, three screens are displayed in a pseudo-overlaid manner, with tabs 51, 52, and 53 for switching the display between the plurality of screens. An input window 54 to which text can be input, such as a search bar, is displayed, too. When operating the electronic device 1 with one hand, the user has difficulty in operating an upper screen 50 displayed in the upper part of the screen in FIG. 6A with the thumb. Hence, the controller 14 in the electronic device 1 according to one of the disclosed embodiments slides the upper screen 50 displayed in the upper part of the display 11 downward, upon detecting a predetermined operation (e.g. sliding) on the back surface touch sensor 13. In this description, the term "upper screen" means a screen included in the upper half of the screen displayed on the display 11. In the example illustrated in FIG. 6, the upper screen 50 includes the tabs 51, 52, and 53 and the input window 54, although the upper screen 50 is not limited to such.

Figure 6B:
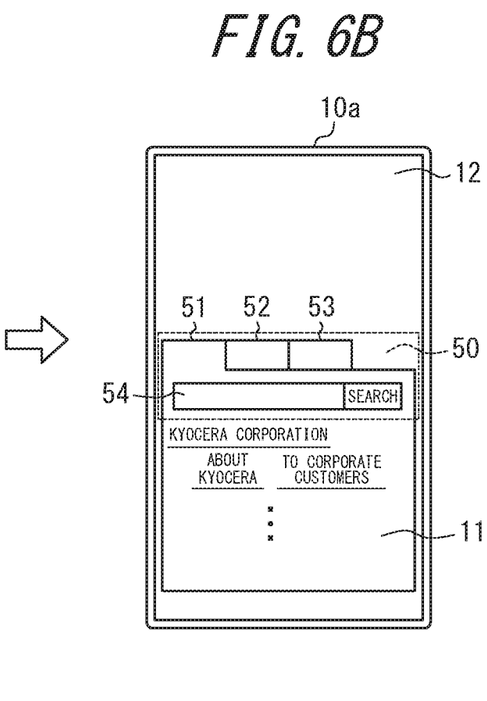

Sliding the upper screen 50 downward may be performed in various manners. As an example, the controller 14 may slide the upper screen 50 to the center part of the display 11 when the predetermined operation on the back surface touch sensor 13 is detected, as illustrated in FIG. 6B. Alternatively, the controller 14 may slide the upper screen 50 downward by a predetermined width each time the predetermined operation on the back surface touch sensor 13 is detected. Regarding the images such as text, photographs, and objects displayed below the upper screen 50, the controller 14 may slide the images downward together with the upper screen 50 as illustrated in FIG. 6B, or separate the images above and below the slid upper screen 50. Moreover, assuming the upper screen 50 as the upper half of the screen, the controller 14 may replace the upper and lower halves of the screen with each other when the predetermined operation on the back surface touch sensor 13 is detected.

The controller 14 may enable one or more objects that are not moved by operating the front surface touch sensor 12, to be moved by operating the back surface touch sensor 13. The objects A to X in FIG. 5 or the upper screen 50 in FIG. 6 is usually not moved by operating the front surface touch sensor 12, and the above-mentioned method provides convenience particularly in such a case.

The controller 14 may, upon detecting sliding on the back surface touch sensor 13, move the objects or the upper screen in the same direction as the detected sliding. For example, upon detecting downward sliding on the back surface touch sensor 13, the controller 14 moves the objects or the upper screen downward. Subsequently, upon detecting upward sliding on the back surface touch sensor 13, the controller 14 moves the objects or the upper screen upward.

Figure 7A:
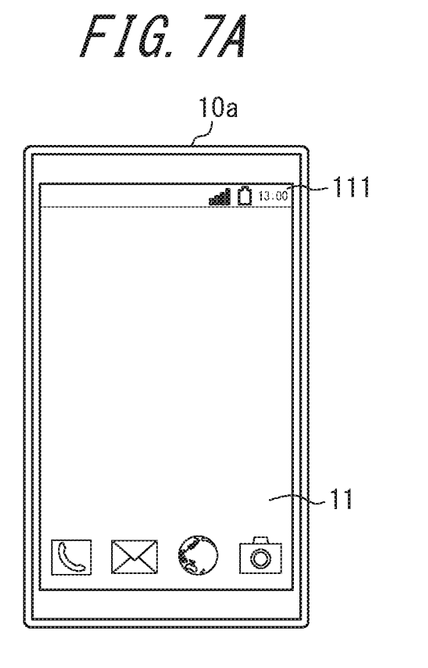
FIGS. 7A to 7B are diagrams illustrating a third mode of the process performed by operating the back surface touch sensor of the electronic device according to Embodiment 1.
Figure 7B:
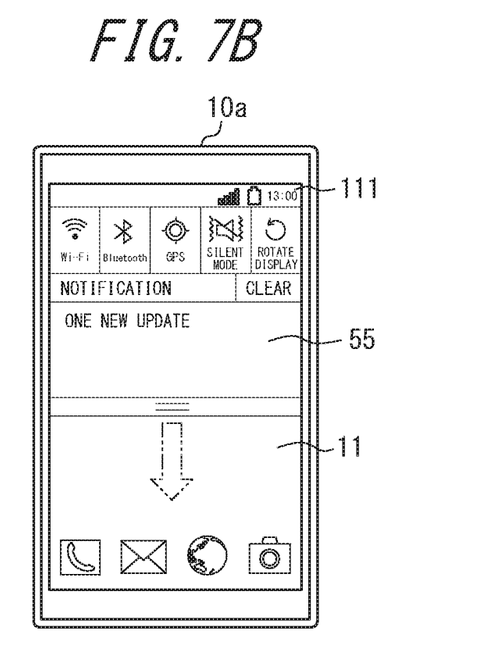

FIG. 7 is a diagram illustrating a third mode of the process performed by operating the back surface touch sensor 13. Although FIG. 7A illustrates a home screen as an example, the back surface touch sensor 13 may be operated during the display of any screen which is not limited to a home screen. Any screen may include an object (or objects) that is not displayed by the display 11 unless a specific operation is performed. Such an object is referred to as a "hidden object" in this description. For example, a launcher application is known that, from a notification bar 111 displayed in the uppermost part of the display 11, displays a hidden object for notifying the user of the statuses of various settings such as communication function and the like. FIG. 7B illustrates a hidden object 55 being displayed in a sliding state.

Typically, the hidden object 55 is displayed by the user touching the notification bar 111 displayed in the upper part of the display 11 and sliding the screen downward from the notification bar 111. However, since the notification bar 111 is displayed in the uppermost part of the display 11, the notification bar 111 might be out of the reach of the thumb when the user operates the electronic device 1 with one hand. Hence, in the electronic device 1 according to one of the disclosed embodiments, operating (e.g. sliding) the back surface touch sensor 13 also enables the display of the hidden object 55 on the display 11. Thus, the controller 14 causes the display 11 to display the hidden object 55 upon detecting the operation on the back surface touch sensor 13.

Preferably, upon detecting sliding on the back surface touch sensor 13, the controller 14 displays the hidden object 55 while sliding it in the same direction as the detected sliding. In other words, upon detecting downward sliding on the back surface touch sensor 13, the controller 14 displays the hidden object 55 while sliding it downward as indicated by the arrow in FIG. 7B. The hidden object 55 may be displayed from the bottom of the display 11 or from the right or left of the display 11. In detail, the controller 14 displays the hidden object 55 while sliding it upward upon detecting upward sliding on the back surface touch sensor 13, and displays the hidden object 55 while sliding it rightward upon detecting rightward sliding on the back surface touch sensor 13. Matching the sliding direction when displaying the hidden object 55 and the sliding direction on the back surface touch sensor 13 in this way improves ease of operation.

Typically, the hidden object 55 is undisplayed (hidden) again by the user's operation of touching the bar displayed in the lowermost part of the hidden object 55 and sliding the screen upward from the bar. However, in the case where the hidden object 55 is displayed on the entire display 11, the bar displayed in the lowermost part of the hidden object 55 might be out of the reach of the thumb. Hence, operating (e.g. sliding) the back surface touch sensor 13 may also enable the hiding of the hidden object 55. In such a case, too, matching the sliding direction when hiding the hidden object 55 to the sliding direction on the back surface touch sensor 13 improves ease of operation. For example, upon detecting downward sliding on the back surface touch sensor 13, the controller 14 displays the hidden object 55 while sliding it downward as illustrated in FIG. 7B. Subsequently, upon detecting upward sliding on the back surface touch sensor 13, the controller 14 hides the hidden object 55 while sliding it upward.

As described above, in the electronic device 1 according to Embodiment 1, the controller 14 changes the position of a displayed object or upper screen upon detecting an operation on the back surface touch sensor 13. Since the object or upper screen is moved to be within the reach of the thumb of the user's hand holding the electronic device 1, the user can keep operating the electronic device 1 with one hand. The electronic device 1 can thus be operated with one hand more easily.

Moreover, in the electronic device 1 according to Embodiment 1, the controller 14 causes the display 11 to display the hidden object 55 upon detecting an operation on the back surface touch sensor 13. The user can display the hidden object 55 by operating the electronic device 1 with only his or her hand holding the electronic device 1. The electronic device 1 can thus be operated with one hand more easily.

Embodiment 2

Figure 8:
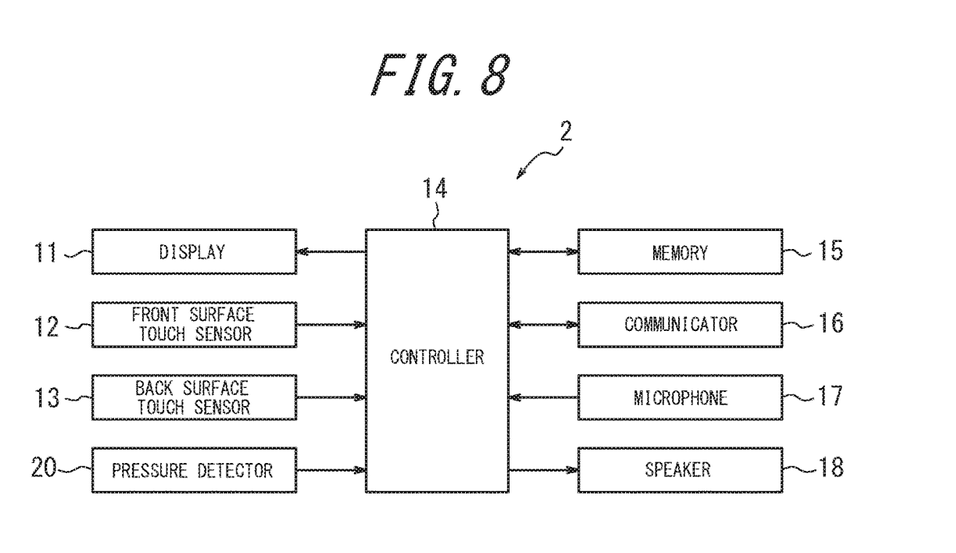
FIG. 8 is a block diagram illustrating the schematic structure of an electronic device according to Embodiment 2.

Embodiment 2 is described below. FIG. 8 is a block diagram illustrating the schematic structure of an electronic device according to Embodiment 2. An electronic device 2 according to Embodiment 2 further includes a pressure detector 20, compared with the electronic device 1 according to Embodiment 1. The other components are the same as those in Embodiment 1, and so they are given the same reference signs and their description is omitted.

The pressure detector 20 detects pressure when the user operates the back surface touch sensor 13, and outputs data based on the pressure to the controller 14. The pressure detector 20 includes, for example, at least one strain gauge sensor or piezoelectric element that changes in physical or electrical characteristics (strain, resistance, voltage, etc.) depending on pressure. For example, in the case where the pressure detector 20 includes at least one piezoelectric element, the piezoelectric element of the pressure detector 20 changes in voltage value (data based on the pressure) as electrical characteristics depending on the magnitude of the load (force) resulting from the pressure on the back surface touch sensor 13 (or depending on the speed (acceleration) at which the magnitude of the load changes). The data based on the pressure may be the magnitude of the load resulting from the pressure, the power value, the resistance value, or the like, instead of the voltage value.

The pressure detector 20 may equally detect pressure when the user operates the front surface touch sensor 12. This embodiment is based on the assumption that the pressure detector 20 also detects pressure when the user operates the front surface touch sensor 12.

The controller 14 acquires the data based on the pressure on the back surface touch sensor 13 (and the front surface touch sensor 12) from the pressure detector 20. The controller 14 determines that a predetermined operation has been performed, in the case where the data based on the pressure satisfies a predetermined criterion.

The pressure detector 20 may be configured depending on the contact detection method. For example, in the case where the contact detection method is the resistive method, the pressure detector 20 may be realized without using a strain gauge sensor, a piezoelectric element, or the like, by associating the resistance corresponding to the contact area with the load of the pressure on the touch surface of the touch sensor. In the case where the touch sensor uses the capacitive method, on the other hand, the pressure detector 20 may be realized without using a strain gauge sensor, a piezoelectric element, or the like, by associating the capacitance with the load of the pressure on the touch sensor.

Figure 9A:
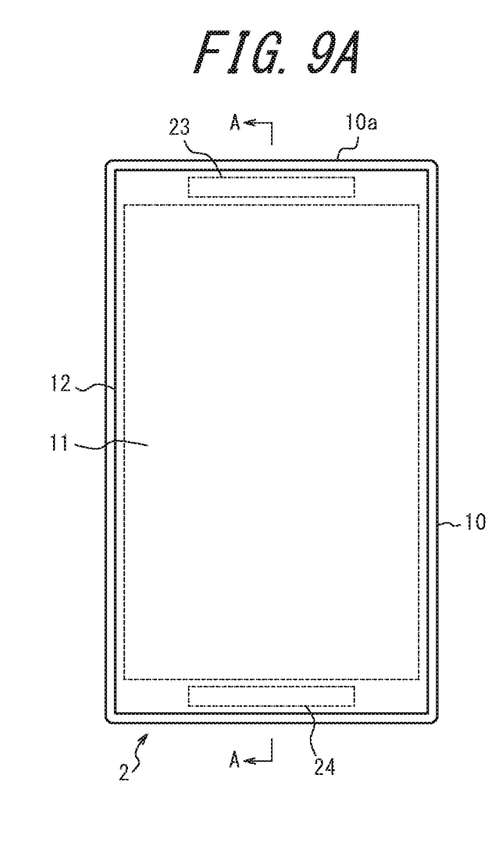
FIGS. 9A to 9C are diagrams illustrating an example of the implementation structure of the electronic device according to Embodiment 2.
Figures 9B, 9C:
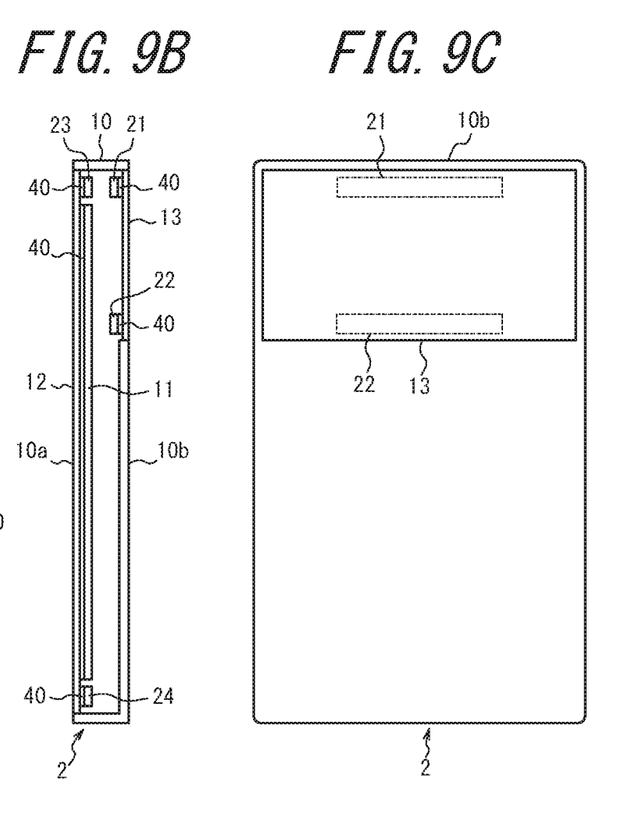

FIG. 9 is a diagram illustrating an example of the implementation structure of the electronic device 2 according to Embodiment 2. FIG. 9A is a front view, FIG. 9B is a sectional view along line A-A in FIG. 9A, and FIG. 9C is a back view. FIG. 9 illustrates piezoelectric elements 21 to 24 that constitute the pressure detector 20, in addition to the implementation structure of the electronic device 1 illustrated in FIG. 2. The number and arrangement of piezoelectric elements are not limited to the illustrated example.

In the example illustrated in FIG. 9, the pressure detector 20 includes a first piezoelectric element 21, a second piezoelectric element 22, a third piezoelectric element 23, and a fourth piezoelectric element 24. The first piezoelectric element 21 and the second piezoelectric element 22 detect pressure when the user operates the back surface touch sensor 13, and the third piezoelectric element 23 and the fourth piezoelectric element 24 detect pressure when the user operates the front surface touch sensor 12.

In FIG. 9A, in the area on the front surface touch sensor 12 where the display by the display 11 does not need to be visible, i.e. where the front surface touch sensor 12 and the display 11 do not overlap, the area near the edges of the front surface touch sensor 12 is preferably painted or covered with a bezel. This makes the third piezoelectric element 23, the fourth piezoelectric element 24, and the like invisible from outside the electronic device 2.

Figure 10:
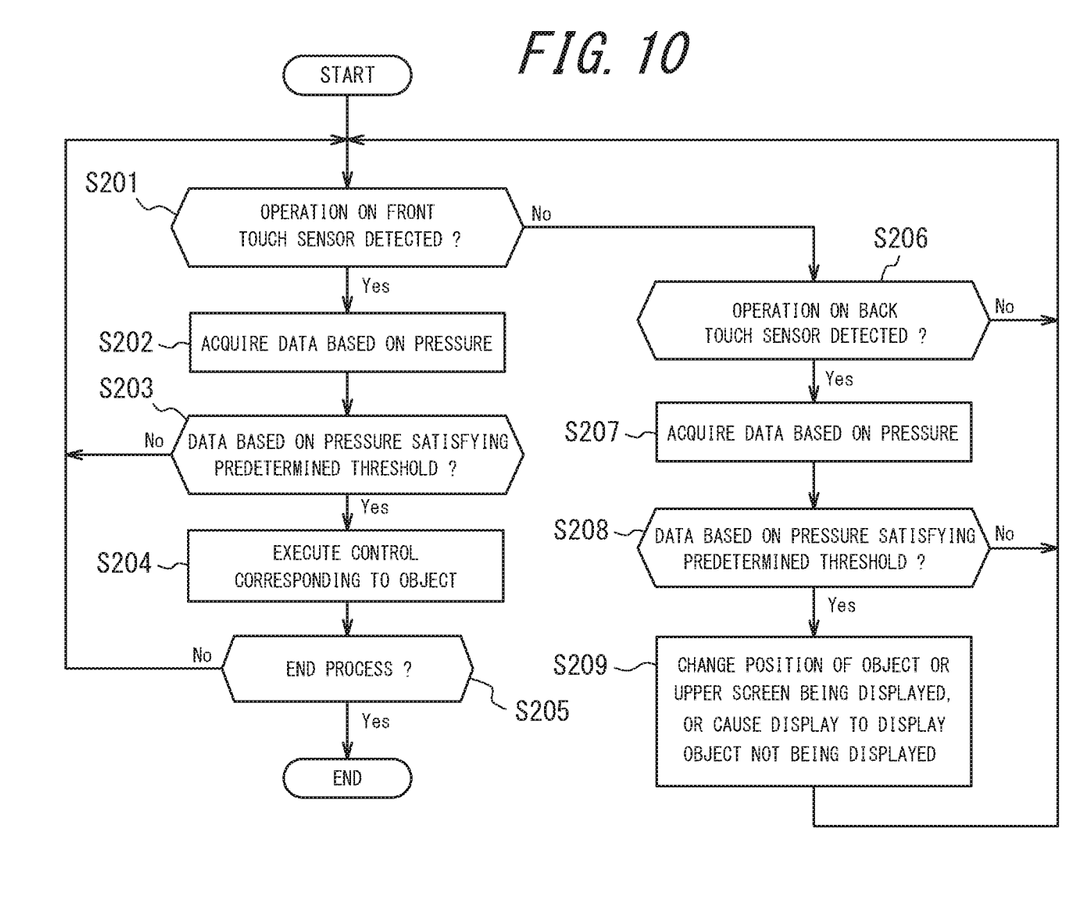
FIG. 10 is a flowchart illustrating the process by the electronic device according to Embodiment 2.

The process by the electronic device 2 according to one of the disclosed embodiments is described below, with reference to FIG. 10. FIG. 10 is a flowchart illustrating the process by the electronic device 2 according to Embodiment 2.

Upon detecting a predetermined operation on the front surface touch sensor 12 from a signal received from the front surface touch sensor 12 (step S201: Yes), the controller 14 acquires data based on pressure on the front surface touch sensor 12 from the pressure detector 20 (step S202). The controller 14 determines whether or not the acquired data based on the pressure satisfies a predetermined threshold (criterion) (step S203). In the case where the data based on the pressure satisfies the predetermined threshold (step S203: Yes), the controller 14 determines that an operation of pressing the front surface touch sensor 12 has been performed, and executes a process corresponding to an object displayed at the pressure position (step S204). Here, the data based on the pressure that satisfies the predetermined threshold may be such data that reaches the predetermined criterion value, data that exceeds the predetermined criterion value, or data that is equal to the predetermined criterion value. In the case where the process in step S204 is a process of ending an application, menu, etc. (step S205: Yes), the controller 14 ends the process and, for example, causes the display 11 to display a home screen (standby screen).

Upon detecting a predetermined operation on the back surface touch sensor 13 from a signal received from the back surface touch sensor 13 (step S206: Yes), the controller 14 acquires data based on pressure on the back surface touch sensor 13 from the pressure detector 20 (step S207). The controller 14 determines whether or not the acquired data based on the pressure satisfies a predetermined threshold (criterion) (step S208). In the case where the data based on the pressure satisfies the predetermined threshold (step S208: Yes), the controller 14 determines that an operation on the back surface touch sensor 13 has been performed, and changes the position of an object or upper screen being displayed or causes the display 11 to display the hidden object 55 not being displayed (step S209). Specific examples of the process in step S209 are as described in Embodiment 1.

The controller 14 may, upon detecting sliding on the back surface touch sensor 13 after the data based on the pressure on the back surface touch sensor 13 satisfies the predetermined criterion, display the hidden object 55 while sliding it in the same direction as the detected sliding. The controller 14 may, upon detecting sliding on the back surface touch sensor 13 during the time when the data based on the pressure on the back surface touch sensor 13 satisfies the predetermined criterion, display the hidden object 55 while sliding it in the same direction as the detected sliding.

As described above, the electronic device 2 according to Embodiment 2 further includes the pressure detector 20, and the controller 14 determines that the back surface touch sensor 13 has been operated in the case where the data based on the pressure on the back surface touch sensor 13 satisfies the predetermined criterion. The electronic device 2 can thus avoid determining that the user has operated the back surface touch sensor 13 despite actually another object having merely lightly touched the back surface touch sensor 13. In particular, although one or more fingers come into contact with the back surface when the user holds the electronic device, the pressure detection by the pressure detector 20 can prevent any contact which the user does not intend as an operation from being erroneously determined as an operation.

Embodiment 3

Figure 11:
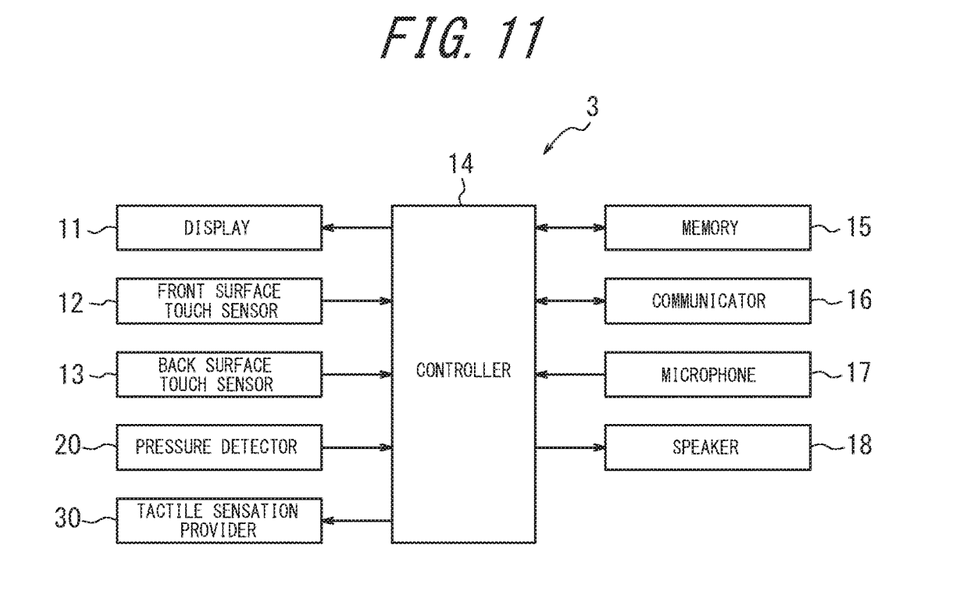
FIG. 11 is a block diagram illustrating the schematic structure of an electronic device according to Embodiment 3.

Embodiment 3 is described below. FIG. 11 is a block diagram illustrating the schematic structure of an electronic device according to Embodiment 3. An electronic device 3 according to Embodiment 3 further includes a tactile sensation provider 30, compared with the electronic device 2 according to Embodiment 2. The other components are the same as those in Embodiment 2, and so they are given the same reference signs and their description is omitted.

The tactile sensation provider 30 generates predetermined vibration based on a drive signal supplied from the controller 14. It suffices for the drive signal to be a drive signal that expresses vibration, at the position contacted by the finger, corresponding to behavior of a real button that is to be expressed.

The tactile sensation provider 30 includes at least one piezoelectric element, ultrasonic transducer, vibration motor (eccentric motor), or the like. The tactile sensation provider 30 generates vibration according to a predetermined vibration pattern to present a tactile sensation to the user's finger pressing the back surface touch sensor 13, thus sensuously notifying the user that he or she has operated the back surface touch sensor 13. The tactile sensation provider 30 may present the tactile sensation to the user's finger pressing the back surface touch sensor 13 by, for example, controlling the electrical charge of a film attached onto the back surface touch sensor 13, without using mechanical vibration.

The tactile sensation provider 30 may equally generate vibration for the front surface touch sensor 12, to present a tactile sensation to the user's finger pressing the front surface touch sensor 12.

The tactile sensation provider 30 may be integrated with the pressure detector 20. Particularly in the case where the pressure detector 20 and the tactile sensation provider 30 each include at least one piezoelectric element, the pressure detector 20 and the tactile sensation provider 30 may share the same piezoelectric element. This is possible because a piezoelectric element generates a voltage when pressure is applied, and is deformed when a voltage is applied. An example of the implementation structure in such a case is as illustrated in FIG. 9.

In the case where the pressure detector 20 and the tactile sensation provider 30 each include at least one piezoelectric element, the controller 14 may, when the voltage value of the piezoelectric element satisfies a predetermined threshold, perform a predetermined process, and also drive the piezoelectric element to generate vibration. The voltage value of the piezoelectric element that satisfies the predetermined threshold may be such a voltage value that reaches the predetermined criterion value, a voltage value that exceeds the predetermined criterion value, or a voltage value that is equal to the predetermined criterion value.

As described above, the electronic device 3 according to Embodiment 3 further includes the tactile sensation provider 30 that generates predetermined vibration based on a drive signal supplied from the controller 14. The electronic device 3 can thus sensuously notify, when the user operates the back surface touch sensor 13 (and the front surface touch sensor 12), the user that the intended operation has been performed.

Although the embodiments have been described above as representative examples, it should be obvious to those skilled in the art that many changes and substitutions may be made to the embodiments described above within the spirit and scope of the disclosure. Therefore, the embodiments described above should not be construed as limiting the disclosure, and various modifications and changes are possible without departing from the scope of the claims. For example, a plurality of structural blocks in any of the embodiments may be combined into one structural block, and one structural block in any of the embodiments may be divided into a plurality of structural blocks.

REFERENCE SIGNS LIST 1, 2, 3 electronic device
11 Display
12 Front surface touch sensor
13 Back surface touch sensor
14 Controller
15 Memory
16 Communicator
17 Microphone
18 Speaker
20 Pressure detector
21 First piezoelectric element
22 Second piezoelectric element
23 Third piezoelectric element
24 Fourth piezoelectric element
30 Tactile sensation provider
40 Joining member
50 Upper screen
51, 52, 53 Tab
54 Input window
55 Hidden object
111 Notification bar

The invention claimed is:
1. An electronic device comprising: a display:
a touch sensor on each of a front surface and a back surface of the electronic device, wherein the touch sensor on the front surface is overlaid on the display and the touch sensor on the back surface is located at a position corresponding to an upper part of the display and not a lower part of the display; and
a controller configured to, upon detecting an operation on the touch sensor on the back surface, change a position of an object displayed in the upper part of the display to the lower part of the display;
wherein: the object, in response to being displayed in the upper part of the display, is not moveable by an operation on the touch sensor in the upper part on the front surface before the position of the object is changed, and
the object, in response to being displayed in the lower part of the display, is operable by operation on the touch sensor on the front surface.

2. The electronic device according to claim 1, wherein the controller is configured to replace upper and lower objects with each other, when changing the position of the object.

3. The electronic device according to claim 1, comprising a pressure detector configured to detect pressure on the touch sensor on the back surface,
wherein the controller is configured to change the position of the object in the case where data based on the pressure detected by the pressure detector satisfies a predetermined criterion.

4. An electronic device comprising:
a display:
a touch sensor on each of a front surface and a back surface of the electronic device, wherein the touch sensor on the front surface is overlaid on the display and the touch sensor on the back surface is located at a position corresponding to an upper part of the display and not a lower part of the display; and
a controller configured to, upon detecting an operation on the touch sensor on the back surface, slide a screen displayed in the upper part of the display downward;
wherein: the screen, in response to being displayed in the upper part of the display, is not moveable by an operation on the touch sensor in the upper part on the front surface before the position of the screen is changed, and
the screen, in response to being displayed in the lower part of the display, is operable by operation on the touch sensor on the front surface.

5. The electronic device according to claim 4, comprising a pressure detector configured to detect pressure on the touch sensor on the back surface,
wherein the controller is configured to slide the screen downward in the case where data based on the pressure detected by the pressure detector satisfies a predetermined criterion.

6. An electronic device comprising: a touch sensor on each of a front surface and a back surface of the electronic device; and
a controller configured to, upon detecting an operation on the touch sensor on the back surface, cause a display to display an object not being displayed unless a specific operation related to function settings is performed;
wherein the object, in response to being displayed in a part of the display which corresponds to the touch sensor on the back surface, is not operable by operation of the touch sensor on the front surface, and
wherein the object, in response to being displayed in a lower part of the display which does not correspond to the touch sensor on the back surface, is operable by operation of the touch sensor on the front surface,
wherein the controller is configured to, upon detecting sliding on the touch sensor on the back surface, cause the display to display the object from an upper part of the display to a lower part of the display while sliding the object in a same direction as the detected sliding.

7. The electronic device according to claim 6,
wherein the controller is configured to, upon detecting sliding on the touch sensor on the back surface, cause the display to display the object while sliding the object in a same direction as the detected sliding.

8. The electronic device according to claim 6, comprising
a pressure detector configured to detect pressure on the touch sensor on the back surface,
wherein the controller is configured to cause the display to display the object in the case where data based on the pressure detected by the pressure detector satisfies a predetermined criterion.

9. The electronic device according to claim 8,
wherein the controller is configured to, upon detecting sliding on the touch sensor on the back surface after the data based on the pressure detected by the pressure detector satisfies the predetermined criterion, cause the display to display the object while sliding the object in a same direction as the detected sliding.

10. The electronic device according to claim 8,
wherein the controller is configured to, upon detecting sliding on the touch sensor on the back surface during a time when the data based on the pressure detected by the pressure detector satisfies the predetermined criterion, cause the display to display the object while sliding the object in a same direction as the detected sliding.

* * * * *